United States Patent [19]

Polón

[11] Patent Number: 4,989,833
[45] Date of Patent: Feb. 5, 1991

[54] METHOD FOR CHANGING THE CHARACTERISTIC CURVE OF A REGULATION VALVE UNDER PRESSURE AND A REGULATION VALVE

[75] Inventor: Juhani Polón, Helsinki, Finland

[73] Assignee: Neles Oy, Helsinki, Finland

[21] Appl. No.: 454,634

[22] Filed: Dec. 21, 1989

[30] Foreign Application Priority Data

Dec. 30, 1988 [FI] Finland ................................. 886051

[51] Int. Cl.⁵ ............................................. F16K 5/10
[52] U.S. Cl. .............................. 251/209; 137/625.32;
    137/1; 251/309; 251/208
[58] Field of Search ............... 251/207, 209, 208, 309;
    137/625.32, 1, 905

[56] References Cited

U.S. PATENT DOCUMENTS

| 3,191,906 | 6/1965 | Zeigler et al. | 251/208 |
|---|---|---|---|
| 3,504,887 | 4/1970 | Okerblom | 251/208 |
| 3,700,003 | 10/1972 | Smith | 251/207 X |
| 3,773,291 | 11/1973 | Grauer | 251/209 X |

FOREIGN PATENT DOCUMENTS 110371 6/1925 Switzerland ........................ 251/207

Primary Examiner—Arnold Rosenthal
Attorney, Agent, or Firm—Cushman, Darby & Cushman

[57] ABSTRACT

A regulation valve and a method for changing the characteristic flow curve and/or the maximum capacity of a regulation valve. The valve consists of a housing provided with a flow duct, a closing member, which is fitted inside the housing in the flow duct and shaped as a body of rotation or as a part of a body of rotation, and a turning shaft which extends from the closing member to outside the housing to facilitate relating the closing member. The shape of the forward edge of the closing face of the closing member differs from the shape of the rearward edge. The characteristic flow curve of the valve is affected by the shape of the edge of the closing face of the closing member at whose side the flow opening starts being formed when the valve is rotated from the closed position to the opened position. To change the characteristic flow and/or the maximum capacity, one of the two directions of rotation is chosen to be the direction of opening of the valve.

9 Claims, 3 Drawing Sheets

METHOD FOR CHANGING THE CHARACTERISTIC CURVE OF A REGULATION VALVE UNDER PRESSURE AND A REGULATION VALVE

BACKGROUND OF THE INVENTION

1. Field of the Invention

The present invention concerns a method for changing the characteristic curve of a regulation valve, the valve consisting of a housing provided with a through flow duct and of a closing member, the closing member is fitted inside the valve housing in the flow duct, and is shaped as a body of rotation or as a part of a body of rotation, and is rotated by means of a turning shaft extending to outside the housing, the shape of the forward edge of the closing face of the closing member or of the flow opening in the closing member differing from the shape of the rearward edge, and the characteristic curve being determined by the shape of the edge of the closing face of the closing member at whose side the flow opening starts being formed when the valve is rotated from the closed position to the opened position. The invention also concerns a regulation valve consisting of a housing provided with a flow through duct, a closing member which is placed in the flow duct inside the housing and which is shaped as a body of rotation or as a part of a body of rotation, and a turning shaft extending from the closing member to outside the housing. The shape of the forward edge of the closing face of the closing member or of the flow duct in the closing member differs from the shape of the rearward edge.

2. Overview of Related Art

The invention is particularly suitable for rotation-regulation valves, such as globe, segment, or plug valves. It is a feature common of these valves that, when the closing member is rotated from the closed position to the opened position, an opening starts being formed beginning from one edge of the closing face of the closing member. Such a valve comprises a housing provided with a flow duct, a closing member fitted in the valve rotatably, and a turning shaft employed for rotating the closing member and passed to outside the housing by means of packing members. A separate seal has been fitted into the housing, or a sealing face has been machined into the housing, which said seal or sealing face may be in contact with the sealing face of rotation on the closing member. Alternatively, there may be a gap between the seal and the closing member, in which case, in the closed position, the flow through the gap is small compared with the flow when the valve is fully open.

In regulation use, performance of the valve can be illustrated by an internal characteristic curve of the valve. The curve represents the flow quantity of a non-compressible medium in relation to the opening angle or the stroke of the valve under standardized conditions while the pressure remains unchanged. The curve is presented by means of the capacity coefficient Cv (Kv) of the valve, by whose means it is possible to calculate the quantity of medium flowing through the valve when the difference in pressure across the valve and the density of the medium are known.

The characteristic curve illustrates the effect of a control signal on the flow quantity of the valve. The shape of the curve is a characteristic feature of the valve which affects the control. Two typical shapes of a characteristic curve are a linear model, and an equi-percentage model. In the linear model, the opening angle and the flow quantity in the valve are at an invariable ratio. On a linear scale, the graph is a straight line. In the equi-percentage model, a standard change in the opening angle or in the signal causes a change in flow that is equal to a preceding change expressed as a percentage. The graph of the flow/opening angle is an exponential curve.

The choice of the valve on the basis of the characteristic curve depends on the object of regulation and on the circumstances. The controllability is also affected by the external control circuit (pipe system). By means of the process controller and the feedback of the position control of the valve, it is still possible to change the model of behavior, but in view of general usability, it is advantageous if the model can be changed readily in the valve itself.

The capacity factor of a valve determines the suitability of the valve for the planned operation. If the requirement of capacity is higher than the capacity of the valve under the conditions concerned, a required quantity does not flow through the valve. On the other hand, if the capacity is excessively high, this means that the operation of the valve takes place within a little area of regulation near the closed position. In such a case the geometric errors and plays in the valve, in the actuator, and in the controller are high in relation to the opening angle or to the stroke, and the circuit does not become stable. The problem is so difficult that attempts have been made to solve it by means of actuators of special constructions, wherein the actuator/controller is tuned to operate in its entire range of operation even if the stroke required by the valve were only a part of the range of operation.

In regulation operation, it is known in prior art to exchange the regulation member of the valve in accordance with the requirements imposed by the conditions of operation. This mode is common in particular in regulation valves of seat type. Exemplifying embodiments are described in the U.S. Pat. No. 3,821,968 and in the German publication No. DE 2,359,717. The replacement can take place only by disassembling the valve.

A construction is also known wherein there is a separately turnable regulation disk in the flow duct in a globe valve/plug cock, U.S. Pat. No. 2,809,662, or wherein there is an exchangeable throttle plate, U.S. Pat. No. 3,610,286.

A drawback of these constructions is that they are complicated and, consequently, expensive. When the change requires replacement of components, the pressure in the pipe system must be lowered to zero. Moreover, in a vertical pipe, the pipe must be emptied for the time of the replacement.

Such globe valves are also known in prior art wherein the shape of the inlet edge of the closing face of the ball differs from the shape of the outlet edge of the closing face. Such valves are described, e.g., in the GB Patents No. 1,151,661 and No. 1,395,038 as well as in the U.S. Pat. No. 4,037,818. These prior-art valves, however, always have the same opening direction and the same closing direction.

SUMMARY OF THE INVENTION

By means of the construction in accordance with the present invention, it is possible to combine the good aspects of the prior-art solutions. The method in accordance with the invention is characterized in that, to change the characteristic curve and/or the maximum capacity, either one of the directions of rotation is chosen as the direction of opening of the valve. The regulation valve in accordance with the invention is characterized in that both edges of the closing face of the closing member or of the flow opening in the closing member have been shaped in accordance with the desired characteristic curves and/or maximum capacities.

The edge of the flow duct in the closing member that is the first to open the path for the flow from the inlet side to the outlet side, i.e. from the first flow duct in the housing to the second flow duct, is shaped in accordance with the chosen first model of conduct. The reversed direction of operation of the actuator alters the situation so that the flow path from the first flow duct into the second flow duct is now opened by the outlet-side edge of the first model, which is shaped so that it corresponds to the desired second model of conduct. In this way, two different characteristic curves and/or two different maximum capacities are obtained. The change can be carried out when the valve is in its place in a pressurized pipe system, e.g., when a change in process values requires it.

The edges of the closing face in the closing member can be shaped in different ways, for example, so that one edge provides an equi-percentage characteristic curve and the other edge a linear characteristic curve. In a corresponding way, it is possible to obtain two different Cv areas by means of different shaping of the edges.

When the closing member is rotated within a range of 180°, instead of the conventional range of 90°, both of the edges of the closing member can be made to operate so that they affect the flow properties of the valve.

As the second flow duct is most appropriately larger than the first flow duct, the capacity of the full opening of the valve can be made equally high with both models of conduct. By turning the closing member by more than 90°, the edge that provided the lower capacity during opening of the valve can be turned to outside the projection formed by the smaller flow duct, in which case the free opening through the valve is at least equal to the smaller flow duct.

For the description of the valve, a segment valve has been used as one embodiment.

BRIEF DESCRIPTION OF THE DRAWINGS

The invention comes out in more detail from the following description and from the accompanying drawings, wherein.

DETAILED DESCRIPTION OF THE PREFERRED EMBODIMENT

Figure 1:
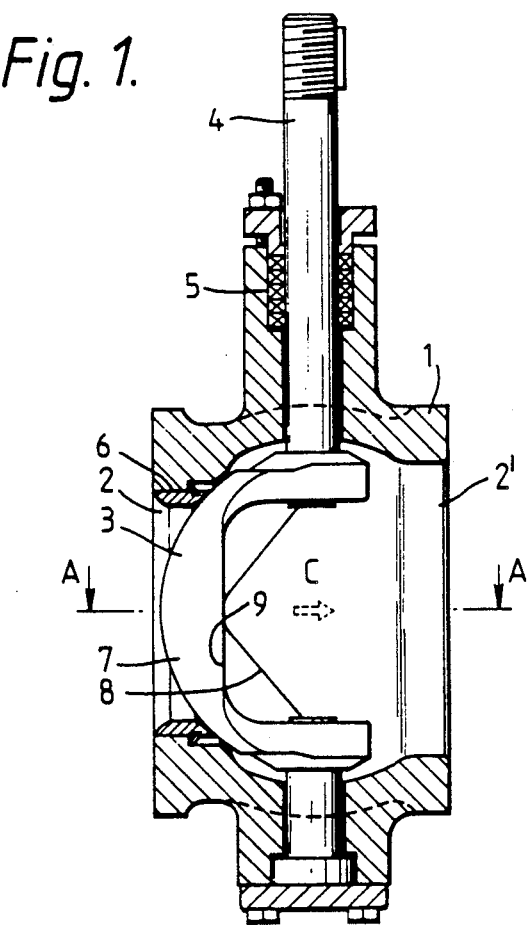
FIG. 1 shows a valve in accordance with the invention in the closed position and as a section taken along the plane of the turning shaft and of the flow duct.
Figure 2:
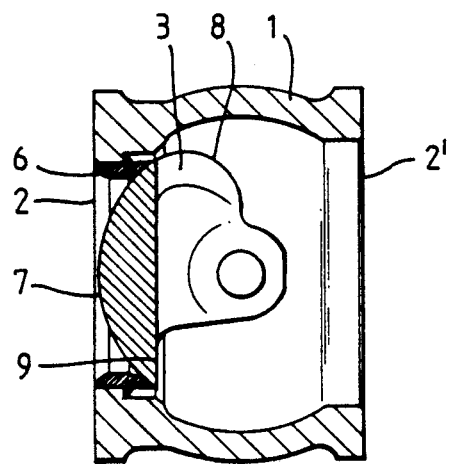
FIG. 2 is a sectional view along line A—A in FIG. 1.

The valve comprises a housing 1, which is provided with a first flow duct 2 and with a second flow duct 2'. The flow direction is denoted with the arrow C. In the embodiment shown in the drawing, the closing member consists of a segment 3 of a ball, to which a turning shaft 4, which projects through the housing, is connected. Between the turning shaft and the housing, a packing arrangement 5 is fitted. Between the housing and the closing member, a closing seal 6 is fitted. The flow comes normally from the side of the seal 6 and meets a throttle point, which is regulated by changing the opening angle between the closing member 3 and the seal 6.

The closing member is provided with a closing face 7 which closes the flow opening. The edges 8 and 9 of the closing face are shaped in different ways, compared with each other; the edge 8 is substantially V-shaped, whereas the edge 9 is parallel to the turning shaft 4. The V-shaped edge 8 provides an equi-percentage characteristic curve, and the straight edge 9 provides a linear characteristic curve. According to the standard, the valve is closed when it is rotated clockwise, seen from the side of the turning shaft 4, and, it is opened when it is rotated counterclockwise. Thus, in the closing direction in accordance with the standard, the edge 8 of the closing member runs ahead as the inlet edge, and the edge 9 runs at the rear as the outlet edge.

According to the invention, the closing direction and the opening direction in the invention are, however, interchangeable, and the closing direction may equally well consist of rotation counterclockwise. In such a case, the edge 9 operates as the inlet edge. Since the shapes of the edges 8 and 9 are different from one another, by changing the direction of closing it is also possible to change the characteristic curve of the valve. The direction of operation can be reversed simply by turning the actuator. The valve itself does not have to be detached from the pipe system, but it can remain under pressure in its place.

Figure 3:
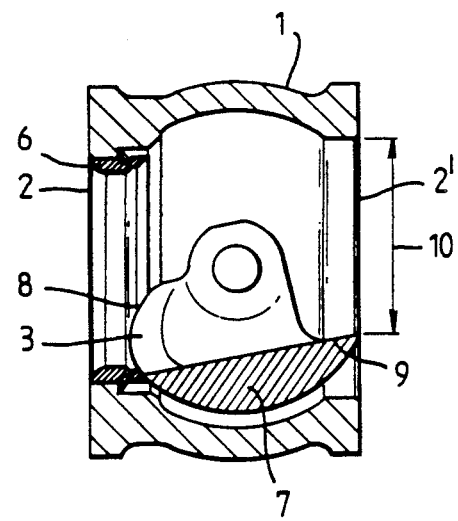
FIG. 3 is the same sectional view when the valve is in an opened position.

In FIG. 3 the closing member has been rotated by more than 90°, whereby the edge that provided the lower capacity has been turned to outside the projection formed by the smaller flow duct 2. The free opening 10 at the side of the larger flow duct 2' is thereby at least equal to the size of the smaller flow duct.

Figure 4:
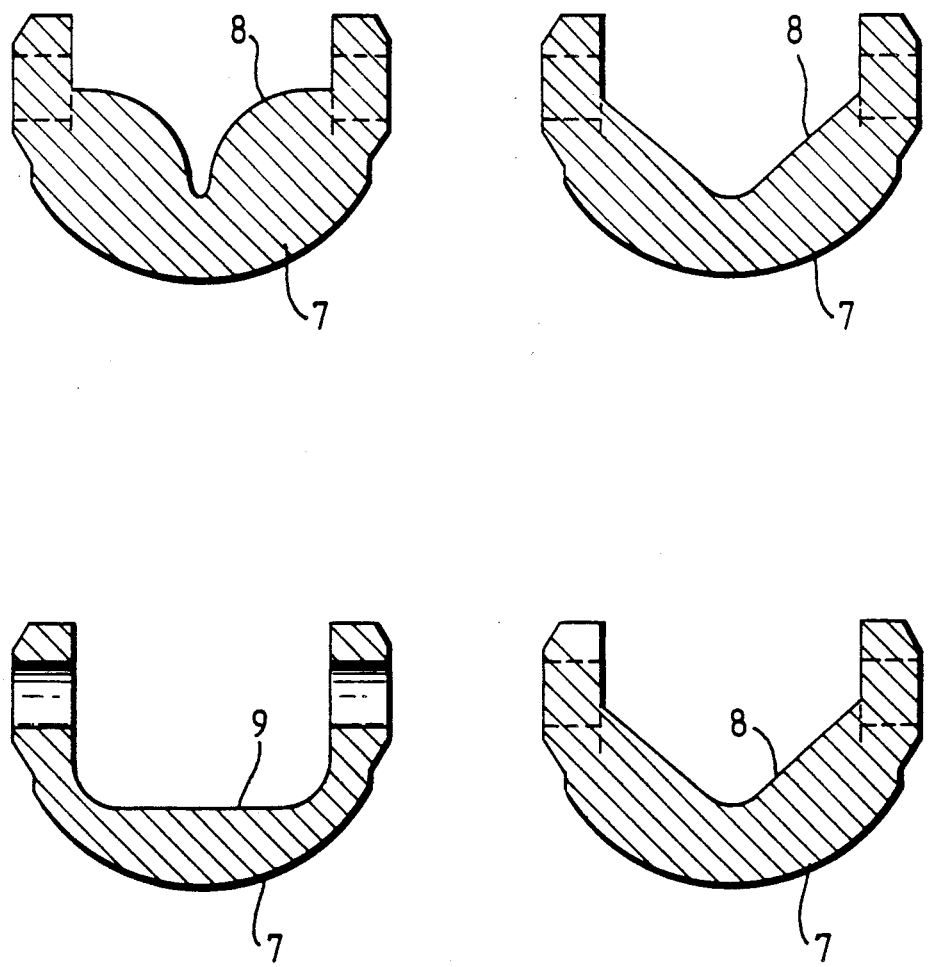
FIG. 4 shows four different shapes of the edge of the closing face of the closing member.

In FIG. 4, different shapes of the edge of the closing face are illustrated, by means of which different characteristic curves are produced. In a V-shaped edge the sides of the V may be curved. The height of the V-shape may vary. The point may be rounded in various ways. These different shapes are in themselves known.

Figure 5:
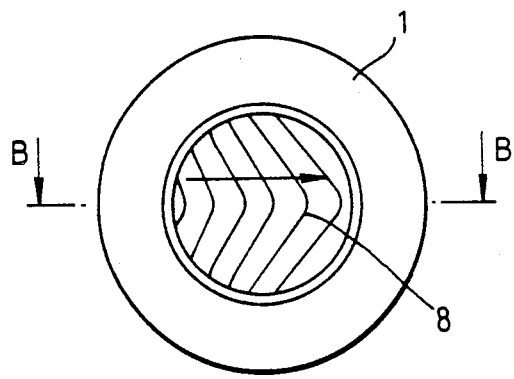
FIG. 5 shows the valve and different positions of the closing face of its closing member seen in the flow direction.
Figure 6:
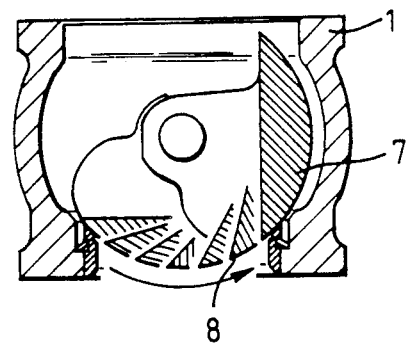
FIG. 6 is a sectional view along line B—B in FIG. 5.

FIGS. 5 and 6 are further illustrations of the way in which the flow opening is changed when the opening angle of the V-shaped edge 8 of the closing face 7 is changed.

The invention is not confined to the embodiment described above alone, but it may shown variation in different ways within the scope of the patent claims.

Instead of a segment of a ball, the shape of the closing member may be, e.g., a ball, a cone or a cylinder or a part of a cone or of a cylinder.

Figure 7:
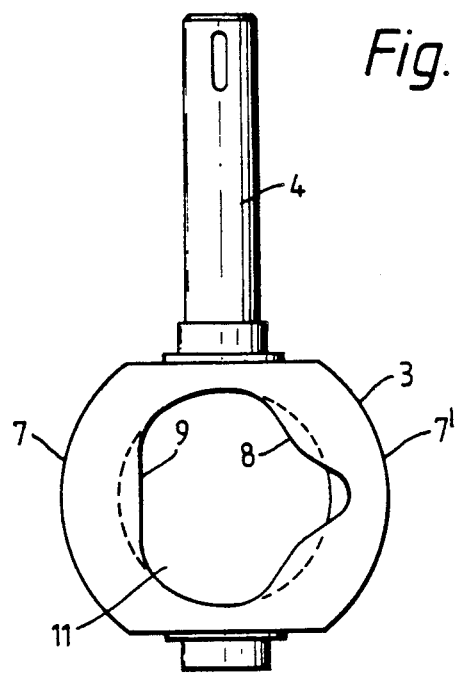
FIG. 7 is an elevational view of another embodiment of the invention.

In FIG. 7, as one embodiment of the invention, a ball is shown which is used as the closing member. In such a case, two different characteristic curves can be provided by shaping the two edges 8 and 9 of the flow duct 11 passing through the ball 3 in accordance with the desired characteristic curves. In such a case, as the closing face at the inlet side, it is possible to use any one of the two closing faces 7 and 7' of the ball. Either one of the edges 8 and 9 of the flow opening is chosen as the inlet edge by reversing the direction of rotation.

What is claimed is:

1. A regulation valve comprising:
    a housing having a first opening and a second opening which are connected by a flow duct;
    a closing member disposed in the flow duct in the housing for regulating flow through the flow duct, the closing member being rotatable about a shaft axis so that a closing face of the closing member closes one of said openings at a time, the closing face closing the flow duct when the closing member is disposed in a closed position, the closing face having a first edge which regulates flow through said one opening when the closing member is rotated from said closed position in a first direction about said shaft axis, the closing face having a second edge which regulates flow through said one opening when the closing member is rotated from said closed position in a direction opposite said first direction about said shaft axis, said first and second edges having different shapes; and
    a turning shaft extending from said closing member to outside the housing for rotating the closing member about said shaft axis in said first and opposite directions.

2. The regulation valve of claim 1 wherein said closing face is substantially in the shape of a portion of a hemisphere.

3. The regulation valve of claim 1 wherein said closing face is substantially in the shape of a wedge-like portion of a cylinder.

4. The regulation valve of claim 1 wherein one of said first and second edges is V-shaped.

5. The regulation valve of claim 1, wherein said first edge of said closing face is formed substantially in accordance with an equi-percentage characteristic flow curve, and wherein the second edge of said closing face is formed substantially in accordance with a linear characteristic flow curve.

6. The regulation valve of claim 1, wherein said first and second edges are formed so that rotation of said closing member in said first direction opens said flow duct to have a different flow capacity than does opening of said flow duct by rotating said closing member in said opposite direction.

7. A method of changing the characteristic flow curve of a regulating valve, the regulating valve comprising:
    a housing having a through flow duct;
    a closing member disposed in the flow duct in the housing for regulating flow through the flow duct, the closing member being rotatable about a shaft axis by an angle so that a closing face of the closing member closes said flow duct when the closing member is disposed in a closed position, the closing face having a first edge which regulates flow through said flow duct when the closing member is rotated from said closed position in a first direction about said shaft axis, the closing face having a second edge which regulates flow through said flow duct when the closing member is rotated from said closed position in a direction opposite said first direction about said shaft axis, said first and second edges having different shapes; and
    a turning shaft extending from said closing member to outside the housing for rotating the closing member about said shaft axis in said first and opposite directions;
    wherein the characteristic flow curve is flow quantity through the flow duct versus said angle under a constant pressure differential across the flow duct, the method comprising the steps of:
    rotating the turning shaft so that the first edge regulates flow through the flow duct when a regulating valve having a first characteristic flow curve is desired to be disposed across the flow duct; and
    rotating the turning shaft so that the second edge regulates flow through the flow duct when a regulating valve having a second characteristic flow curve is desired to be disposed across the flow duct.

8. A method of making a regulation valve with a first and a second desired characteristic flow curve, the regulation valve comprising:
    a housing having a through flow duct;
    a closing member disposed in the flow duct in the housing for regulating flow through the flow duct, the closing member being rotatable about a shaft axis by an angle so that a closing face of the closing member closes said flow duct when the closing member is disposed in a closed position, the closing face having a first edge which regulates flow through said flow duct when the closing member is rotated from said closed position in a first direction about said shaft axis, the closing face having a second edge which regulates flow trough said flow duct when the closing member is rotated from said closed position in a direction opposite said first direction about said shaft axis, said first and second edges having different shapes; and
    a turning shaft extending from said closing member to outside the housing for rotating the closing member about said shaft axis in said first and opposite directions;
    wherein the characteristic flow curve is flow quantity through the flow duct versus said angle under a constant pressure differential across the flow duct, the method comprising the steps of:
    selecting the shape of said first edge so that regulation of flow through the flow duct by said first edge is in accordance with said first desired characteristic flow curve; and
    selecting the shape of the said second edge so that regulation of flow through the flow duct by said second edge is in accordance with said second desired characteristic flow curve.

9. The method of making a regulation valve of claim 8 wherein the regulation valve is made to have a first and a second maximum flow rate, wherein the step of selecting the shape of said first edge is made in accordance with said first maximum flow rate, and wherein the step of selecting the shape of said second edge is made in accordance with said second maximum flow rate.

* * * * *